(12) United States Patent
Leonardi et al.

(10) Patent No.: US 11,783,304 B2
(45) Date of Patent: Oct. 10, 2023

(54) SYSTEMS AND METHODS FOR USING TOKEN APPLICATION PROGRAMMING INTERFACES

(71) Applicant: JPMORGAN CHASE BANK, N.A., New York, NY (US)

(72) Inventors: June M Leonardi, Glen Mills, PA (US); Ammar Muhammad, Newark, DE (US); Russ Tyndale, Berlin, NJ (US); Rahul Sinha, Glen Mills, PA (US); Jonathan Rosner, White Plains, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 15 days.

(21) Appl. No.: 17/464,567

(22) Filed: Sep. 1, 2021

(65) Prior Publication Data

US 2023/0063947 A1   Mar. 2, 2023

(51) Int. Cl.

| | |
|---|---|
| *G06Q 30/00* | (2023.01) |
| *G06Q 20/02* | (2012.01) |
| *G06F 9/54* | (2006.01) |
| *G06Q 30/0226* | (2023.01) |
| *G06F 16/245* | (2019.01) |
| *G06Q 40/03* | (2023.01) |
| *G06Q 20/32* | (2012.01) |

(52) U.S. Cl.
CPC .............. *G06Q 20/02* (2013.01); *G06F 9/541* (2013.01); *G06F 16/245* (2019.01); *G06Q 30/0233* (2013.01); *G06Q 40/03* (2023.01); *G06Q 20/326* (2020.05)

(58) Field of Classification Search
None
See application file for complete search history.

(56) References Cited

U.S. PATENT DOCUMENTS

| | | | |
|---|---|---|---|
| 2019/0147515 A1* | 5/2019 | Hurley | G06Q 20/3821 705/44 |
| 2019/0318341 A1* | 10/2019 | Makhotin | G06Q 20/02 |
| 2019/0370790 A1* | 12/2019 | Spector | H04L 9/3215 |
| 2020/0302436 A1* | 9/2020 | Ilincic | G06Q 20/352 |
| 2021/0406879 A1* | 12/2021 | Noë | G06Q 20/227 |

* cited by examiner

*Primary Examiner* — Matthew T Sittner
(74) *Attorney, Agent, or Firm* — GREENBERG TRAURIG LLP

(57) ABSTRACT

Systems and methods for using token application programming interfaces are disclosed. According to an embodiment, a method for using token programming interfaces may include: (1) receiving, at an eligibility application programming interface (API), a token or a Digital Primary Account Number (DPAN) for a financial instrument from a merchant or a payment facilitator backend; (2) calling, by the eligibility API, a Funding Primary Account Number (FPAN) lookup API with the token or DPAN; (3) receiving, by the eligibility API, the FPAN for the token or DPAN from the FPAN lookup API; (4) generating, by the eligibility API, an issuer reference identifier for the FPAN; (5) storing, by the eligibility API, a mapping between the FPAN and the issuer reference identifier; and (6) communicating, by the eligibility API and via the eligibility API, the issuer reference identifier to the merchant or the payment facilitator backend.

9 Claims, 3 Drawing Sheets

SYSTEMS AND METHODS FOR USING TOKEN APPLICATION PROGRAMMING INTERFACES

BACKGROUND OF THE INVENTION

1. Field of the Invention

Embodiments relate generally to systems and methods for using token application programming interfaces.

2. Description of the Related Art

Reward point earning credit cards are popular; using points, however, is not always easy. Often, a customer must go to a separate website to use reward points, and the selection of products to purchase may be limited.

SUMMARY OF THE INVENTION

Systems and methods for using token application programming interfaces are disclosed. According to an embodiment, a method for using token programming interfaces may include: (1) receiving, at an eligibility application programming interface (API), a token or a Digital Primary Account Number (DPAN) for a financial instrument from a merchant or a payment facilitator backend; (2) calling, by the eligibility API, a Funding Primary Account Number (FPAN) lookup API with the token or DPAN; (3) receiving, by the eligibility API, the FPAN for the token or DPAN from the FPAN lookup API; (4) generating, by the eligibility API, an issuer reference identifier for the FPAN; (5) storing, by the eligibility API, a mapping between the FPAN and the issuer reference identifier; and (6) communicating, by the eligibility API and via the eligibility API, the issuer reference identifier to the merchant or the payment facilitator backend.

In one embodiment, the FPAN API may look up the FPAN for the token or the DPAN in a token vault.

In one embodiment, the method may further include: receiving, by the eligibility API, a call from a third API with the issuer reference identifier; retrieving, by the eligibility API, the FPAN mapped to the issuer reference identifier; and communicating, by the eligibility API, the FPAN to the third API.

In one embodiment, the third API may include an enrollment API, a points balance API, a points redemption API, or an address retrieval API.

In one embodiment, the merchant or the payment facilitator backend may call the third API with the issuer reference identifier.

According to another embodiment, an electronic device may include a computer processor and a memory storing an eligibility application programming interface (API). When executed by the computer processor, the eligibility API may cause the computer processor to: receive a token or a Digital Primary Account Number (DPAN) for a financial instrument from a merchant or a payment facilitator backend; call a Funding Primary Account Number (FPAN) lookup API with the token or DPAN; receive the FPAN for the token or DPAN from the FPAN API; generate an issuer reference identifier for the FPAN; store a mapping between the FPAN and the issuer reference identifier; and communicate the issuer reference identifier to the merchant or the payment facilitator backend.

In one embodiment, the FPAN API may look up the FPAN for the token or the DPAN in a token vault.

In one embodiment, the eligibility API may further causes the computer processor to: receive a call from a third API with the issuer reference identifier; retrieve the FPAN mapped to the issuer reference identifier; and communicate the FPAN to the third API.

In one embodiment, the third API may include an enrollment API, a points balance API, a points redemption API, or an address retrieval API.

In one embodiment, the merchant or the payment facilitator backend may call the third API with the issuer reference identifier.

According to another embodiment, a system may include a merchant or payment facilitator backend configured to receive a token or a Digital Primary Account Number (DPAN) for a financial instrument; an eligibility application programming interface (API) configured to receive the DPAN from the merchant or payment facilitator backend; a Funding Primary Account Number (FPAN) lookup API configured to receive the DPAN from the eligibility API and look up the FPAN for the DPAN and return the FPAN to the eligibility API. The eligibility API may be further configured to generate an issuer reference identifier for the FPAN, to store a mapping between the FPAN and the issuer reference identifier, and to communicate the issuer reference identifier to the merchant or the payment facilitator backend.

In one embodiment, the FPAN API may be configured to look up the FPAN for the token or the DPAN in a token vault.

In one embodiment, the eligibility API may be further configured to receive a call from a third API with the issuer reference identifier; retrieve the FPAN mapped to the issuer reference identifier; and communicate the FPAN to the third API.

In one embodiment, the third API may include an enrollment API, a points balance API, a points redemption API, or an address retrieval API.

In one embodiment, the merchant or the payment facilitator backend may call the third API with the issuer reference identifier.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to token programming interfaces.

Figure 1:
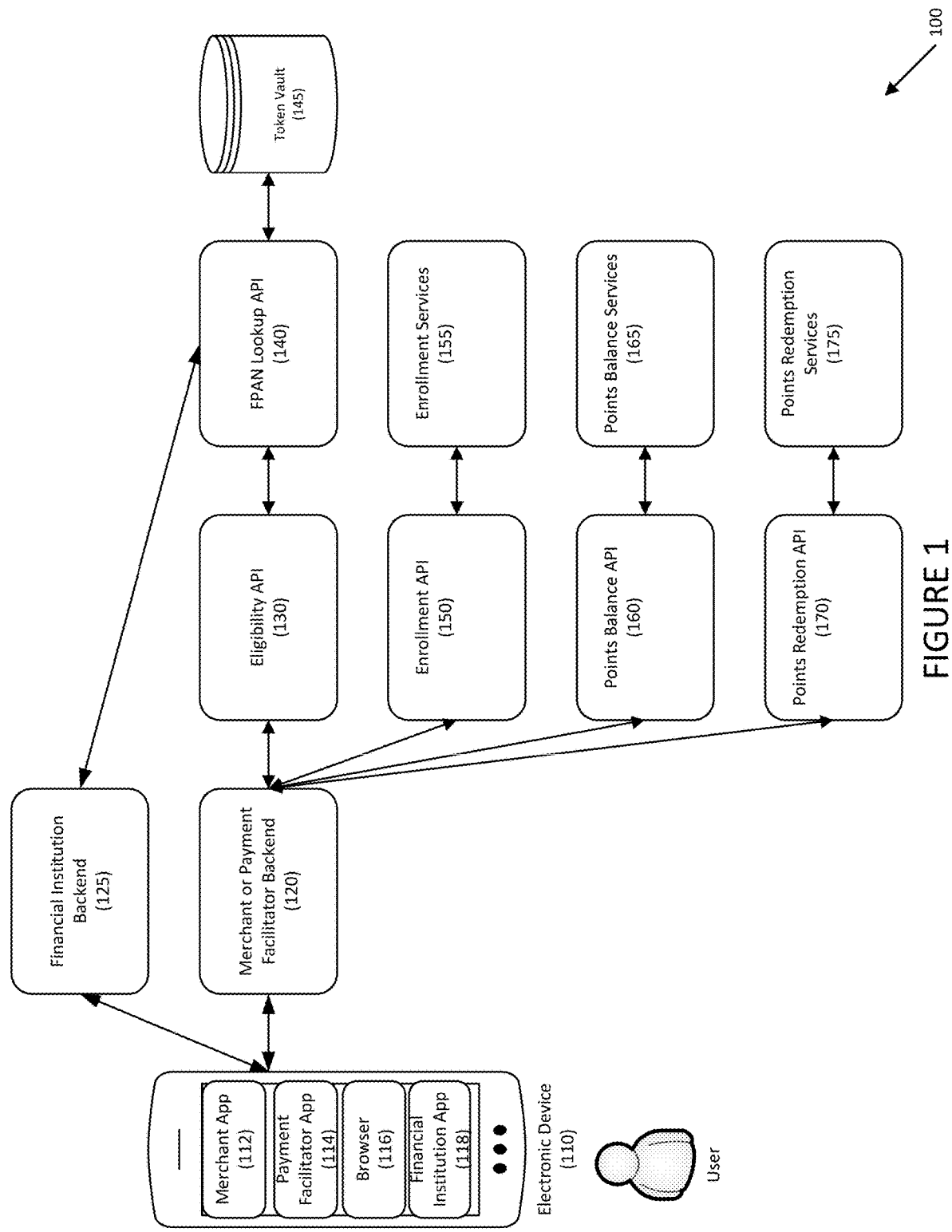
FIG. 1 depicts a system for using a token programming interface according to an embodiment.

Referring to FIG. 1, a system for using token programming interfaces is disclosed according to one embodiment. System 100 may include customer electronic device 110, which may be any suitable electronic device (e.g., computers, smartphones, Internet of Things appliances, etc.) that may execute one or applications or programs, such as merchant app 112, payment facilitator app 114, browser 116, etc. In one embodiment, merchant app 112, payment facilitator app 114, and/or browser 116 may interface with merchant or payment facilitator backend 120.

A payment facilitator may be any entity that facilitates payments between a customer and a merchant, such as PayPal, ApplePay, GooglePay, LevelUp, DoorDash, etc.

In one embodiment, merchant or payment facilitator backend 120 may provide an interface for the customer to select and/or purchase goods or services from a merchant. The customer may pay for the goods or services using a financial instrument, an alternate currency (e.g., reward or loyalty points, etc.).

Merchant or payment facilitator backend 120 may interface with a plurality of APIs, such as eligibility API 130.

Eligibility API 130 may receive a call from merchant or payment facilitator backend 120 with a token or DPAN for a customer financial instrument. Eligibility API 130 may then call Funding Primary Account Number (FPAN) lookup API 140 with the token or DPAN. FPAN lookup API 140 may look up the FPAN for the DPAN or token using a mapping stored in token vault 145. FPAN lookup API 140 may then return the FPAN to eligibility API 130.

Token vault 145 may be provided by a financial institution, a payment network, a third party, etc.

Eligibility API 130 may cause the generation and storage of a unique identifier for the FPAN, such as an issuer reference identifier. In one embodiment, eligibility API 130 may call other APIs (not shown) to effect this process. The issuer reference identifier may be used with other APIs, such as enrollment API 150, points balance API 160, points redemption API 170, etc. to take an action, such as enrolling the FPAN via enrollment service 155, retrieving a points balance via points balance service 165, redeeming points with points redemption service 175, etc. For example, merchant or payment facilitator backend 120 may provide the issuer reference identifier to points balance API 160 to have points balance service 165 retrieve and return a points balance for the account associated with the issuer reference identifier.

In one embodiment, points balance API 160, points redemption API 170, etc. may call eligibility API 130 to with the issuer reference identifier to receive the FPAN mapped to the issuer reference identifier as is necessary and/or desired.

System 100 may further include financial institution backend 125 for an issuing financial institution. Financial institution backend 125 may access, for example, FPAN lookup API 140, to retrieve a FPAN for a DPAN. For example, if fraud is suspected at the DPAN level, using financial institution app 118, browser 116, or by telephone, a user may inform financial institution backend 125 of suspected fraud, and financial institution backend 125 may use FPAN lookup API 140 to identify the FPAN and then retrieve and cancel all DPANs associated with the FPAN.

Other services may be provided and may be accessed via APIs, such as an address retrieval or verification backend (not shown) using an address retrieval or verification API (not shown), retrieving customer preferences, customer interests, etc.

Figure 2:
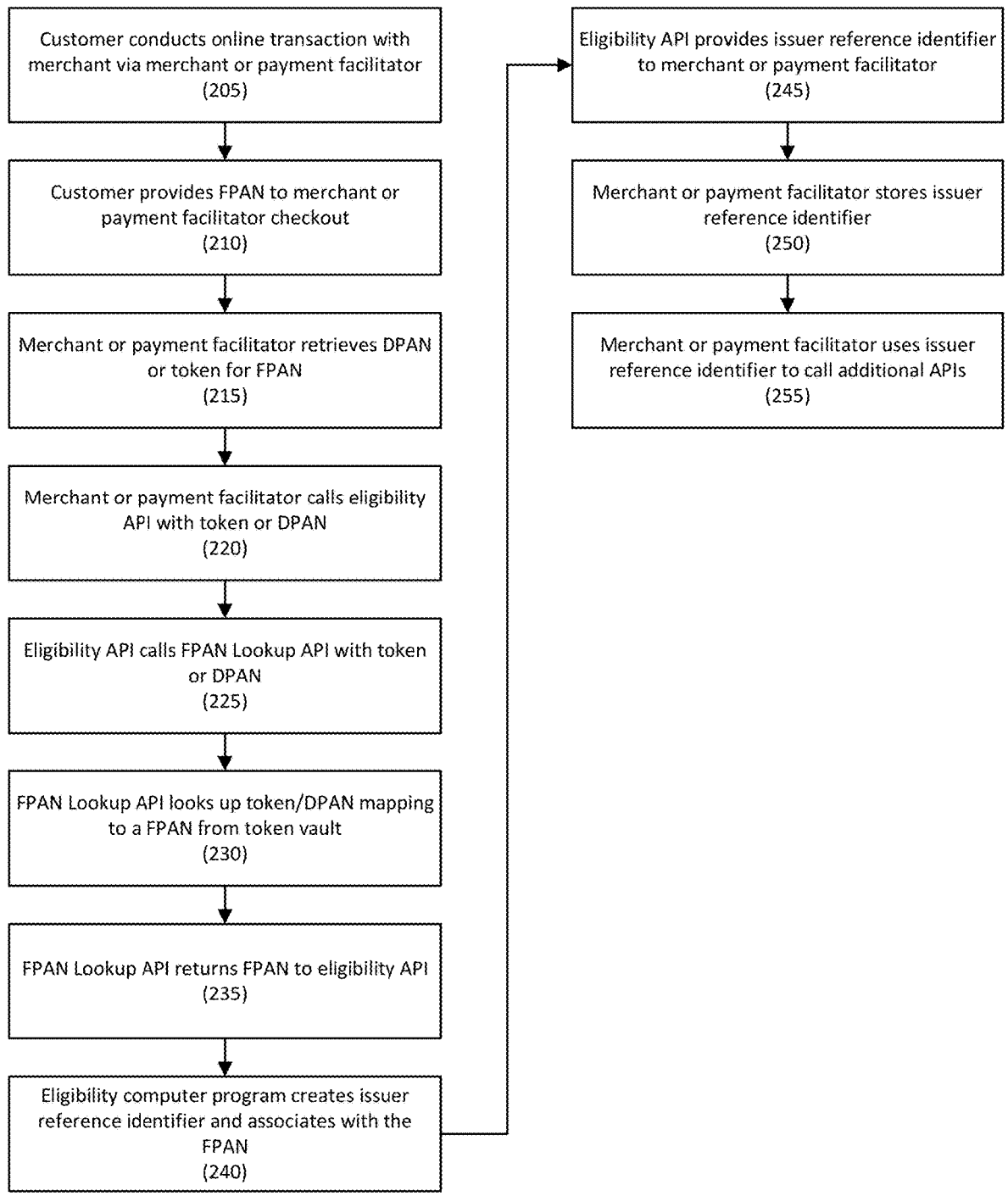
FIG. 2 depicts a method for using a token programming interface according to an embodiment.

Referring to FIG. 2, a method for using token programming interfaces is disclosed according to an embodiment.

In step 205, a customer may conduct an online transaction with a merchant or payment facilitator. For example, the customer may select one or more goods or services from a merchant, and may seek to conduct the transaction with the merchant or a payment facilitator, such as a third party.

In step 210, the customer may provide a FPAN to a merchant or payment facilitator checkout interface.

In step 215, the merchant or payment facilitator may use a tokenization process to retrieve a DPAN associated with the FPAN. For example, the merchant or payment facilitator may call a payment network, third party token provider, etc. to tokenize or retrieve a token for the FPAN.

In step 220, the merchant or payment facilitator may call an eligibility API with the token or DPAN, and, in step 225, the eligibility API may call a FPAN lookup API with the token or DPAN.

In step 230, the FPAN lookup API may retrieve the FPAN for the token or DPAN by looking up a mapping between the token or DPAN and the FPAN in a token vault. In step 235, the FPAN lookup API may return the FPAN to the eligibility API.

In step 240, the eligibility API may cause the generation of an issuer reference identifier for the FPAN and may associate the issuer reference identifier to the FPAN. The association may be stored in a database. The eligibility API may receive calls from other APIs for the mapping as is necessary and/or desired.

In step 245, the eligibility API may provide the issuer reference identifier to the merchant or payment facilitator, and in step 250, the merchant or payment facilitator may store the issuer reference identifier. In step 255, the merchant or payment facilitator may use the issuer reference identifier to call additional APIs, such as an enrollment API, a points balance API, a points redemption API, an address retrieval API, etc.

Figure 3:
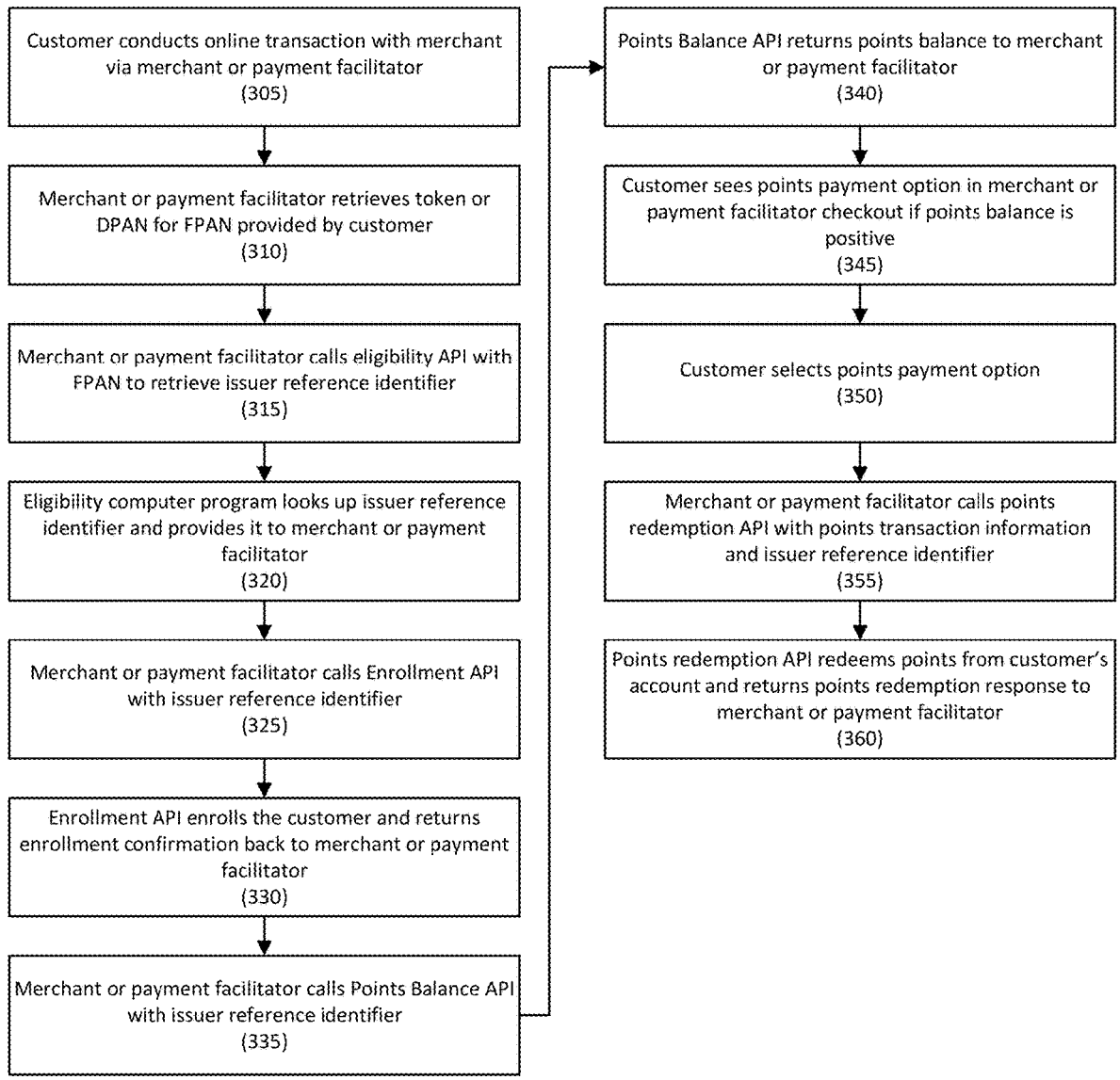
FIG. 3 depicts a method for using a token programming interface according to another embodiment.

Referring to FIG. 3, a method for using token programming interfaces is disclosed according to another embodiment.

In step 305, a customer may conduct an online transaction with a merchant or payment facilitator. For example, the customer may select one or more goods or services from a merchant, and may seek to conduct the transaction with the merchant or a payment facilitator, such as a third party. The customer may provide a FPAN to the merchant or payment facilitator.

In step 310, the merchant or payment facilitator may use a tokenization process to retrieve a DPAN associated with the FPAN. For example, the merchant or payment facilitator may call a payment network, third party token provider, etc. to tokenize or retrieve a token for the FPAN.

In step 315, the merchant or payment facilitator may call the eligibility API with the token or DPAN to retrieve the issuer reference identifier for the token or DPAN.

In step 320, the eligibility API may retrieve the issuer reference identifier for the token or DPAN from a store mapping, and may return the issuer reference identifier to the merchant or payment facilitator.

In step 325, the merchant or payment facilitator may call an enrollment API with the issuer reference identifier, and in step 330, the enrollment API enrolls the customer and returns enrolment confirmation back to the merchant or payment facilitator.

In step 335, the merchant or payment facilitator may call an API, such as a points balance API, with the issuer reference identifier to retrieve the customer's reward points balance. In step 340, the points balance API may return the customer's points balance to the merchant or payment facilitator.

In step 345, if the customer has a positive points balance, the merchant or payment facilitator may display a reward points payment option in the merchant or payment facilitator checkout.

In step 350, the customer may select the reward points payment option, and in step 355, the merchant or payment facilitator may call an API, such as a points redemption API, with points transaction information and issuer reference identifier. For example, the merchant or payment facilitator may provide the number of points to use, the total transaction amount, etc.

In step 360, the points redemption API may redeem points from customer's account, and may return a points redemption response to the merchant or payment facilitator.

In embodiments, a customer may report suspected fraud on a token (i.e., DPAN) to, for example, an issuing financial institution backend. The financial institution backend may call the FPAN lookup API with the DPAN to identify the FPAN. The financial institution backend may then identify all tokens (DPANs) associated with the FPAN, and may delete the DPANs.

In another embodiment, an issuing financial institution may partner with a merchant or payment facilitator to provide an offer or benefit to a cardholder. The merchant or payment service provider may tokenize its customers' cards on file. The merchant or payment facilitator may send the DPAN to the eligibility API. The eligibility API may return an issuer reference identifier back to the merchant or payment facilitator. The merchant or payment facilitator may use the issuer reference identifier for subsequent API calls.

In another embodiment, an issuing financial institution may partner with a merchant or payment facilitator to provide a lending service to customer. The merchant or payment service provider may tokenize its customers' cards on file. The merchant or payment facilitator may send the DPAN to the eligibility API. The eligibility API may return an issuer reference identifier back to the merchant or payment facilitator. The merchant or payment facilitator may use the issuer reference identifier for subsequent API calls.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programming logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using token programming interfaces, comprising:
   receiving, at an eligibility application programming interface (API), a token or a Digital Primary Account Number (DPAN) for a financial instrument from a merchant or a payment facilitator backend;
   calling, by the eligibility API, a Funding Primary Account Number (FPAN) lookup API with the token or DPAN, wherein the FPAN API is configured to look up the FPAN for the token or the DPAN in a token vault, wherein the token vault maintains a mapping of the FPAN to the token or the DPAN;
   receiving, by the eligibility API, the FPAN for the token or DPAN from the FPAN lookup API;
   generating, by the eligibility API, an issuer reference identifier for the FPAN;
   storing, by the eligibility API, a mapping between the FPAN and the issuer reference identifier;
   communicating, by the eligibility API and via the eligibility API, the issuer reference identifier to the merchant or the payment facilitator backend;
   receiving, by the eligibility API, a call from a third API with the issuer reference identifier;

retrieving, by the eligibility API, the FPAN mapped to the issuer reference identifier; and communicating, by the eligibility API, the FPAN to the third API.

2. The method of claim 1, wherein the third API comprises an enrollment API, a points balance API, a points redemption API, or an address retrieval API.

3. The method of claim 1, wherein the merchant or the payment facilitator backend calls the third API with the issuer reference identifier.

4. An electronic device, comprising:
a computer processor; and
a memory storing an eligibility application programming interface (API);
wherein, when executed by the computer processor, the eligibility API causes the computer processor to:
receive a token or a Digital Primary Account Number (DPAN) for a financial instrument from a merchant or a payment facilitator backend;
call a Funding Primary Account Number (FPAN) lookup API with the token or DPAN, wherein the FPAN API is configured to look up the FPAN for the token or the DPAN in a token vault, wherein the token vault maintains a mapping of the FPAN to the token or the DPAN;
receive the FPAN for the token or DPAN from the FPAN API;
generate an issuer reference identifier for the FPAN;
store a mapping between the FPAN and the issuer reference identifier;
communicate the issuer reference identifier to the merchant or the payment facilitator backend;
receive a call from a third API with the issuer reference identifier;
retrieve the FPAN mapped to the issuer reference identifier; and
communicate the FPAN to the third API.

5. The electronic device of claim 4, wherein the third API comprises an enrollment API, a points balance API, a points redemption API, or an address retrieval API.

6. The electronic device of claim 4, wherein the merchant or the payment facilitator backend calls the third API with the issuer reference identifier.

7. A system comprising:
a merchant or payment facilitator backend configured to receive a token or a Digital Primary Account Number (DPAN) for a financial instrument;
an eligibility application programming interface (API) configured to receive the DPAN from the merchant or payment facilitator backend;
a Funding Primary Account Number (FPAN) lookup API configured to receive the DPAN from the eligibility API and look up the FPAN for the DPAN and return the FPAN to the eligibility API;
wherein the eligibility API is further configured to generate an issuer reference identifier for the FPAN, to store a mapping between the FPAN and the issuer reference identifier, to communicate the issuer reference identifier to the merchant or the payment facilitator backend, to receive a call from a third API with the issuer reference identifier; retrieve the FPAN mapped to the issuer reference identifier; and communicate the FPAN to the third API.

8. The system of claim 7, wherein the third API comprises an enrollment API, a points balance API, a points redemption API, or an address retrieval API.

9. The system of claim 7, wherein the merchant or the payment facilitator backend calls the third API with the issuer reference identifier.

\* \* \* \* \*